United States Patent
Lee

(10) Patent No.: US 6,295,787 B1
(45) Date of Patent: Oct. 2, 2001

(54) INSULATED OUTER STRUCTURE FOR REFRIGERATED FOOD STORAGE APPARATUS AND FOAM INJECTION METHOD USING THE SAME

(75) Inventor: Young-Kil Lee, Choongchungnam-do (KR)

(73) Assignee: Mando Climate Control Corporation, Dheong Nam-Do (KR)

( * ) Notice: Subject to any disclaimer, the term of this patent is extended or adjusted under 35 U.S.C. 154(b) by 0 days.

(21) Appl. No.: 09/390,471

(22) Filed: Sep. 3, 1999

(51) Int. Cl.⁷ .............................. F25D 11/00; F25D 23/02
(52) U.S. Cl. .................................. 52/784.15; 52/784.13; 52/783.19; 52/792.1; 52/794.1; 52/758.1; 52/801.12; 52/309.7; 312/405; 312/405.1; 312/408; 220/592.1; 220/592.01; 220/592.02
(58) Field of Search ........................... 52/309.11, 784.13, 52/784.15, 783.19, 792.1, 794.1, 798.1, 801; 220/592.1, 592.01, 592.02, 592.09; 312/400, 401, 405, 406, 408; 62/377

(56) References Cited

U.S. PATENT DOCUMENTS

| | | | |
|---|---|---|---|
| 4,593,449 | * 6/1986 | Meray-Hovarth et al. | 29/527.1 |
| 4,713,921 | * 12/1987 | Minialoff et al. | 52/579 |
| 4,726,707 | * 2/1988 | Newton | 404/25 |
| 4,740,042 | 4/1988 | Stich et al. | 312/138 |
| 5,033,182 | 7/1991 | Winterheimer et al. | 29/460 |
| 5,313,762 | * 5/1994 | Guillemet | 52/790 |
| 5,369,901 | 12/1994 | Revlett | 40/405 |
| 5,588,731 | * 12/1996 | Schmidt et al. | 312/405 |
| 6,036,292 | * 3/2000 | Mandel et al. | 312/405 |
| 6,138,432 | * 10/2000 | Banicevic | 52/784.15 |
| 6,151,857 | * 11/2000 | Rashke | 52/426 |

* cited by examiner

Primary Examiner—Winnie S. Yip
Assistant Examiner—Patrick J. Chavez
(74) Attorney, Agent, or Firm—Nath&Associates PLLC; Harold L. Novick

(57) ABSTRACT

An outer structure for a refrigerated food storage apparatus includes an outer shell forming a visible exterior of the apparatus; and an inner liner made of molded plastic and coupled to the outer shell, to form an inter-panel space to be filled with a body of foam insulation. The inner liner includes bosses of a predetermined length, integrally formed with the inner liner at regular intervals and extending toward the outer shell, to support and maintain a constant spacing between the outer shell and inner liner; a foam-injection inlet for injecting foam; and vents for exhausting air and gases generated during a foam injection process. A reactive foam completely fills the inter-panel space, to form a consistent body of insulation. The force of the reactive foam filling the inter-panel space closes a hinged first flap for covering the foam-injection inlet and a plurality of hinged second flaps for covering the vents. The foam-injection inlet is formed in the bottom of a container centrally installed on the inner liner, to communicate with the inter-panel space.

10 Claims, 3 Drawing Sheets

INSULATED OUTER STRUCTURE FOR REFRIGERATED FOOD STORAGE APPARATUS AND FOAM INJECTION METHOD USING THE SAME

BACKGROUND OF THE INVENTION

1. Field of the Invention

The present invention relates to a refrigerated food storage apparatus and, more particularly, to a structure of an outer wall or hinged door of such an apparatus, in which a plurality of integrally formed bosses are provided on an inner panel or panels of the structure, to extend outward within an inter-panel space filled with an insulating body by a reactive foam injection process.

2. Discussion of the Related Art

A food storage apparatus, commonly known as a refrigerator or freezer, generally includes an insulated interior cabinet formed by five outer walls and at least one hinged door provided on a side or top surface. The outer walls and door are essentially comprised of a combination of inner and outer panels which are spaced apart from each other using a spacing means connected to the outer panel, thereby forming an inter-panel space. A body of insulation, e.g., Styrofoam, is injected into the inter-panel space using a foam injection process, to completely fill the space. Thus, the interior cabinet is thermally insulated for the storage of perishable foodstuffs and the like. The food storage apparatus is designed such that, once the air in the interior cabinet is refrigerated (or heated) to a desired temperature, the temperature is maintained by insulating the cabinet's interior from its exterior and blocking the effluence of the temperature-controlled air. Generally speaking, the design and structure of the door of the apparatus has a greater affect on this operation than the outer walls.

Specifically, the spacing means is integrally formed with the outer panel (shell), which forms the exterior shape of such a food storage apparatus and is generally made of a plastic material. The inner panel (liner) forms the shape of the interior cabinet and is also typically made of plastic. The panels are combined to form an outer wall or door using a conventional coupling means.

In the structure of the insulated outer wall or door as described above, the spacing means is realized by a plurality of bosses (spacers) integrally formed with the outer panel, to support the combination of the panels and maintain a constant panel separation distance which defines the inter-panel space. The bosses are provided at regular intervals on the inner side of the outer panel, to extend inward, by a molding process using heat. Therefore, one end (bottom) of the boss is common with the outer panel forming the visible exterior of the food storage apparatus. After the molding process, the bosses are cooled and a contraction takes place at the bottom of each boss, forming a series of slight depressions in the outer panel. Such imperfections in the exterior surface of a food storage apparatus detract from its appearance, by producing an uneven surface considered unsightly.

The foam injection process is conventionally performed with the workpiece (e.g., door) situated horizontally while the space between the door's outer and inner panels is filled with the foam. To ensure a closely coupled fit during foam injection, the inner and outer panels are held tightly together using an auxiliary support means. The door is then left undisturbed for a predetermined time to allow the foam to set. The horizontal orientation of the door leads to difficulties in achieving an even consistency of the filled foam throughout the inter-panel space, whereby the foam fills the space insufficiently and/or disproportionally and the insulation efficiency is thereby degraded. The foam injection process also generates gases which transform an unshaped body of the foam insulation, i.e., before setting, so that the foam injected first and pushed to the rear of the inter-panel space with continued injection bears the pressure of the generated gases. Besides a further hindrance to achieving a consistently filled inter-panel space, the pressure of the generated gases has the potential to buckle one or the other of the panels.

After completing the foam injection process, the surface of the outer panel is finished. That is, the outer panel is generally provided with a foam injection hole for introducing the foam into the inter-panel space. The foam injection hole is sealed to prevent foreign matter from entering the inter-panel space and is then finished (smoothed) to achieve an attractive appearance. The finishing process of the foam injection hole is time consuming and difficult. More importantly, however, even a well-finished hole is unsightly and detracts from the appearance of the food storage apparatus.

SUMMARY OF THE INVENTION

It is therefore an object of the present invention to overcome the problems encountered in the conventional art.

It is another object of the present invention to provide an insulated outer structure for a refrigerated food storage apparatus, in which the appearance of the exterior surface of the structure is enhanced.

It is yet another object of the present invention to provide an insulated outer structure for a refrigerated food storage apparatus, which simplifies manufacture by eliminating the need to perform a finishing process for completing the structure.

It is still another object of the present invention to provide an insulated outer structure for a refrigerated food storage apparatus, in which insulation efficiency is improved.

It is a further object of the present invention to provide an insulated outer structure for a refrigerated food storage apparatus, which facilitates a foam injection process by enabling a consistent filling of the inter-panel space with an insulating body.

It is a yet further object of the present invention to provide an insulated outer structure for a refrigerated food storage apparatus, which facilitates a foam injection process by obviating the need for auxiliary support means for holding the inner and outer panels closely together during foam injection.

It is a still further object of the present invention to provide an insulated outer structure for a refrigerated food storage apparatus, which enables an insulating body to be injected into the inter-panel space without the danger of buckling the panels.

To accomplish the above and other objects of the present invention, there is provided an insulated outer structure for a refrigerated food storage apparatus. The structure comprises an outer shell forming a visible exterior of the refrigerated food storage apparatus; and an inner liner made of molded plastic and coupled to the outer shell using coupling means, to form an inter-panel space to be filled with a body of foam insulation. The inner liner includes a plurality of bosses of a predetermined length, integrally formed with the inner liner at regular intervals and extending toward the outer shell, to support and maintain a constant spacing between the outer shell and the inner liner, at least one foam-injection inlet for injecting foam into the inter-panel space, and a plurality of vents for exhausting air and gases generated during a foam injection process.

A reactive foam completely fills the inter-panel space, to form a consistent body of insulation. The force of the reactive foam filling the inter-panel space closes a hinged first flap for covering the foam-injection inlet and a plurality of hinged second flaps for covering the vents. The foam-injection inlet is formed in the bottom of a container centrally installed on the inner liner, to communicate with the inter-panel space.

Another aspect of the present invention is realized by a method for performing the foam injection process. The method comprises the steps of providing the inner liner with a hinged first flap for covering at least one foam-injection inlet centrally formed in a surface of the inner liner and a hinged second flap for covering a plurality of vents peripherally formed in a surface of the inner liner, wherein the hinges of the flaps are arranged on a common side; orienting the structure such that the inner liner faces upward in an inclined manner which elevates the plurality of vents, the hinges of the flaps being arranged downward along the incline and the flaps being in an open position; steadily injecting a reactive foam into the inter-panel space to completely fill the inter-panel space with the foam, so that air within the inter-panel space and gases generated by the reactive foam are vented via the plurality of vents and the injected foam pushes the flaps closed; and allowing the foam-filled structure to set for a predetermined time.

The structure according to the present invention is useful in facilitating a foam injection process performed on insulated outer walls of a refrigerated food storage apparatus, e.g., a household refrigerator or commercial freezer, as well as a hinged door therefor. The foam injection process employs a reactive foam to form a consistent body of insulation filling the inter-panel space.

BRIEF DESCRIPTION OF THE DRAWINGS

The above and other advantages and features of the present invention will become more apparent from the following description of embodiments in conjunction with the accompanying drawings, in which.

DETAILED DESCRIPTION OF THE PREFERRED EMBODIMENTS

Figure 1:
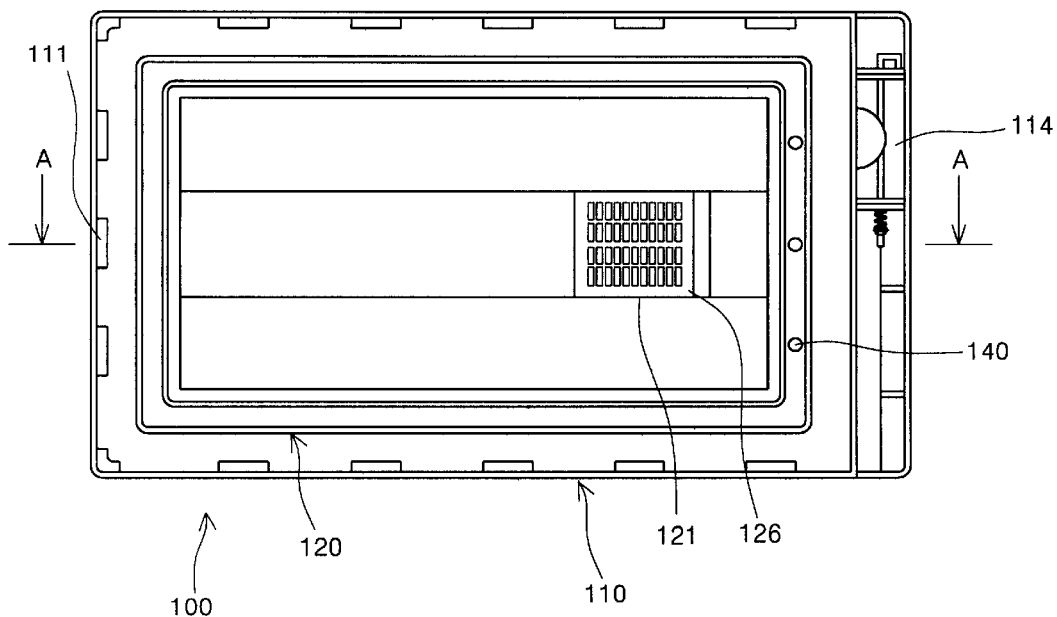
FIG. 1 is a plan view of the inner side of an insulated outer structure (e.g., door) for a refrigerated food storage apparatus, according to a preferred embodiment of the present invention.
Figure 2:
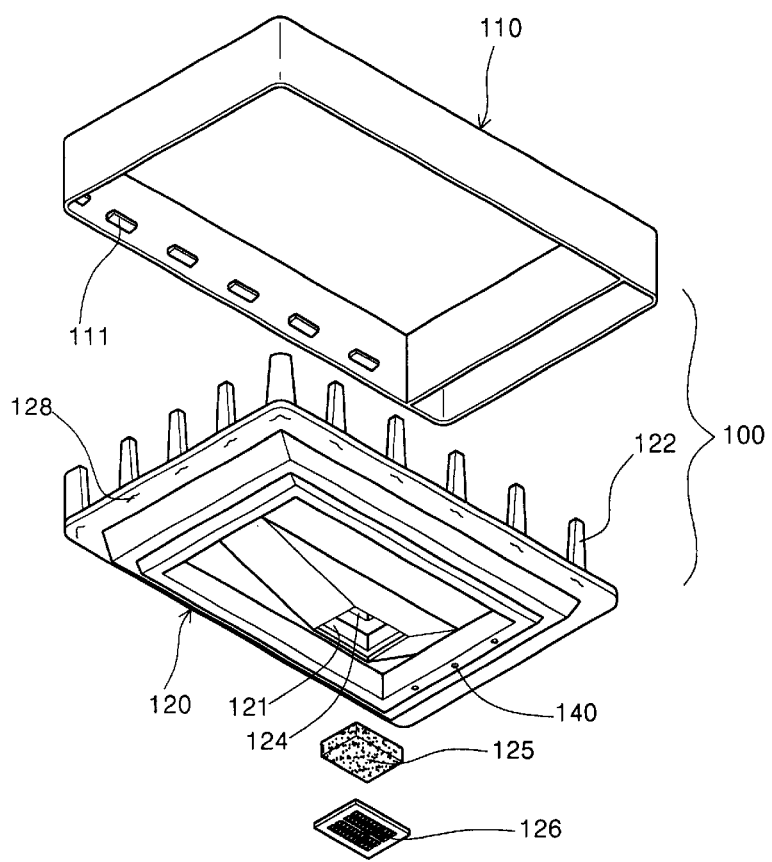
FIG. 2 an exploded view of the door of FIG. 1.

Referring to FIGS. 1 and 2, an insulated outer structure 100, shown here in the form of a door, for a refrigerated food storage apparatus, e.g., a household refrigerator or commercial freezer, is provided with an outer shell 110 and an inner liner 120, each of which are largely made of plastic materials. The inner liner 120 is coupled with the outer shell 110 using a conventional snap-fit coupling means enabled by snap-fit tabs 111 provided along the perimeter of the inner side of the outer shell, to interlock with the perimeter of the inner liner. In this instance, the door includes a hinge 114 installed at one end thereof.

As an ordinary feature of convenience provided for a refrigerated food storage apparatus, a ventilated container 121 for storing a deodorizing element 125 for depositing a deodorant is centrally installed in the inner liner 120. A container cover 126 retains the deodorizing element 125 and allows for a periodic replacement of the element.

As a characteristic feature of the present invention, a plurality of bosses 122 are integrally formed on the inner liner 120 instead of the outer shell 110. That is, in the structure 100 of the insulated outer wall or door as described above, the spacing means for forming an inter-panel space is realized on a surface of the inner liner 120, which forms an interior surface of the food storage apparatus, to extend into the inter-panel space. Thus, the bosses 122, which are of equal height and provided at regular intervals on the outer-shell side of the inner liner 120, each have one end (the bottom) in common with the inner liner, so that the ensuing formation of depressions 128 resulting from the cooling step of the molding process does not create imperfections in the visible exterior surface of the outer shell 110. Such imperfections present on a surface of the interior cabinet (not shown) do not detract greatly from the appearance of a refrigerated food storage apparatus and can be disguised or concealed with other panels. In any event, however, the depressions 128 of the present invention are covered by snap-fit tabs as described below.

Figure 3:
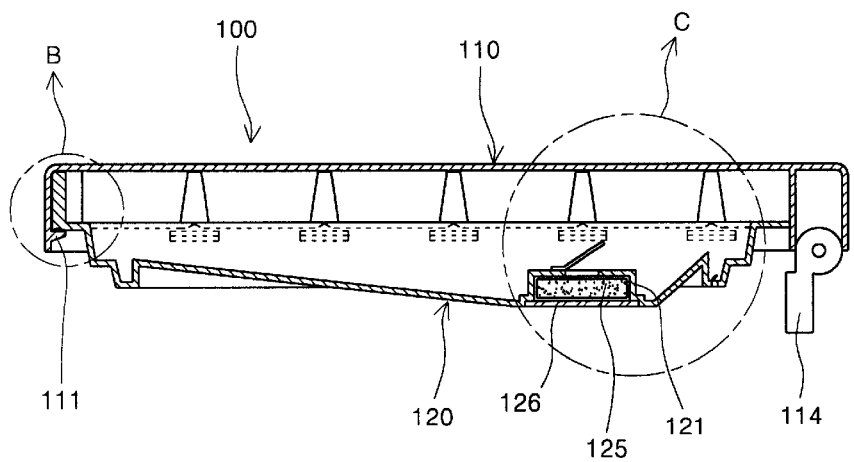
FIG. 3 is a cross-sectional view taken along line "A—A" of FIG. 1, showing in detail the spacing means of the inner liner of the present invention.
Figure 4:
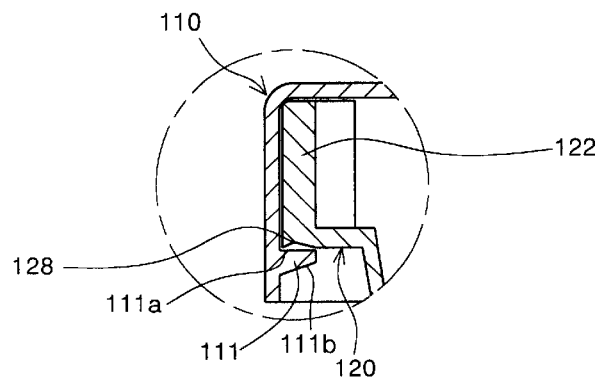
FIG. 4 is a detailed cross-sectional view of area "B" of FIG. 3.

Referring FIGS. 3 and 4, a plurality of the snap-fit tabs 111, which have roughly the same lateral dimension as that of the bosses 112, are used in coupling the inner liner 120 to the outer shell 110, by firmly inserting the inner liner into the outer shell. Once snapped into place, the inner liner 120 is held securely against the outer shell 110 by the snap-fit tabs 111. To facilitate this operation, each snap-fit tab 111 is provided with a sloped surface 111a for receiving the edges of the inner liner 120 during insertion and a flat surface 111b for retaining the inner liner after insertion. Therefore, the outer shell 110 and inner liner 120 need no auxiliary support to maintain a closely coupled fit during the foam injection described below.

Figure 5:
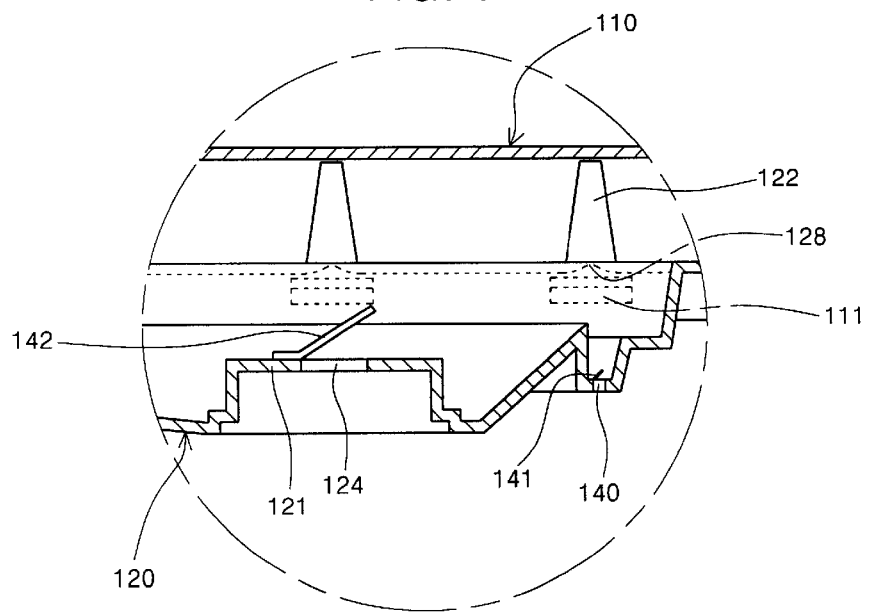
FIG. 5 is a detailed cross-sectional view of area "C" of FIG. 3.
Figure 7:
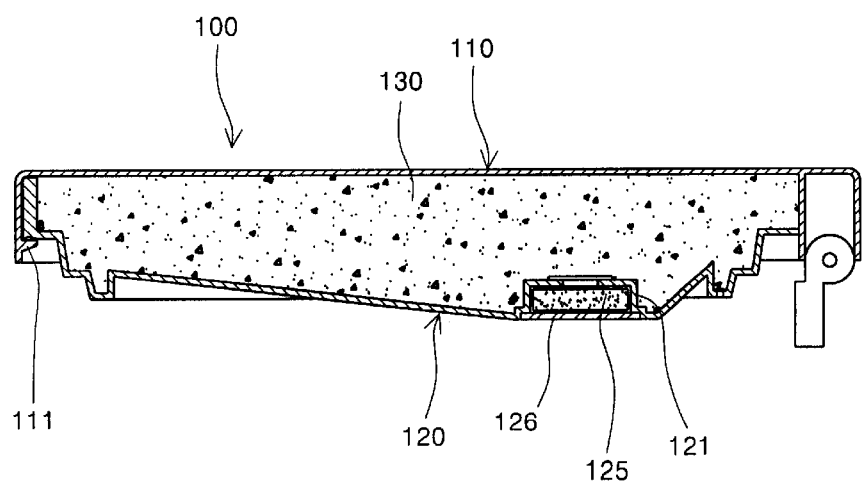
FIG. 7 is a cross-sectional view taken along line "A—A" of FIG. 1, showing the injected foam consistently filling the inter-panel space.

Referring to FIGS. 3 and 5, the ventilated container 121 is installed at a suitable position on the inner liner 120 to provide a deodorizing effect to the interior cabinet where refrigerated foodstuffs are to be stored. The bottom surface of the ventilated container 121 is provided with a foam-injection inlet 124, which is hidden from view when the refrigerated food storage apparatus accessed (opened) by the user. A first flap 142 is installed at the bottom of the ventilated container 121, to be hinged along the one side thereof, thus operating as a check valve. As the liquid foam is injected through the foam-injection inlet 124, using an insertion means such as a flexible tube (not shown), the foam is injected into the inter-panel space. With the inter-panel space thus filled, the first flap 142 is pushed by the expanding foam against the bottom of the ventilated container 121, to close off the opening as shown in FIG. 7. With the foam-injection inlet 124 thus sealed, there is no leakage of the foam before setting. After setting, the seal provided by the first flap 142 is sufficient to prevent foreign matter from entering the inter-panel space, so that no sealing process is necessary. Moreover, since there is no externally visible foam injection hole, there is no finishing process to be performed. Additional foam-injection inlets 124 with corresponding first flaps 142 may be utilized for larger structures, structures of an unusual shape, or those having partitioned inter-panel spaces.

In addition, a plurality of vents 140 for exhausting air and other gases are formed in the inner liner 120, the vents being positioned well to one side of the insulated outer structure 100, in this case, between the foam-injection inlet 124 and the hinge 114. The vents 140 assist in the injection of the foam, by exhausting trapped gases generated during the foam injection process, so that the structure 100 can be filled easily and a consistent body of insulation can be formed to completely fill the inter-panel space. Though three such vents are shown in the embodiment of the present invention, the number and positioning of the vents 140 is determined based on the size and shape of the insulated outer structure 100. The vents 140 are provided with a plurality of second flaps 141, hinged in the same manner as the first flap 142 and on the same side, to close off the respective vents, though a common flap may cover all the vents simultaneously, and no such flap may be required in the event that the vents are very small. As in the operation of the first flaps 142, the second flaps 141 remain open until the last phase of the foam injection process, when the expanding foam pushes the flaps against the inner liner 120 and thereby closes off the vents 140, as shown in FIG. 7.

The first and second flaps may be made of a variety of materials and are preferably made of a very soft plastic having great flexibility.

Figure 6:
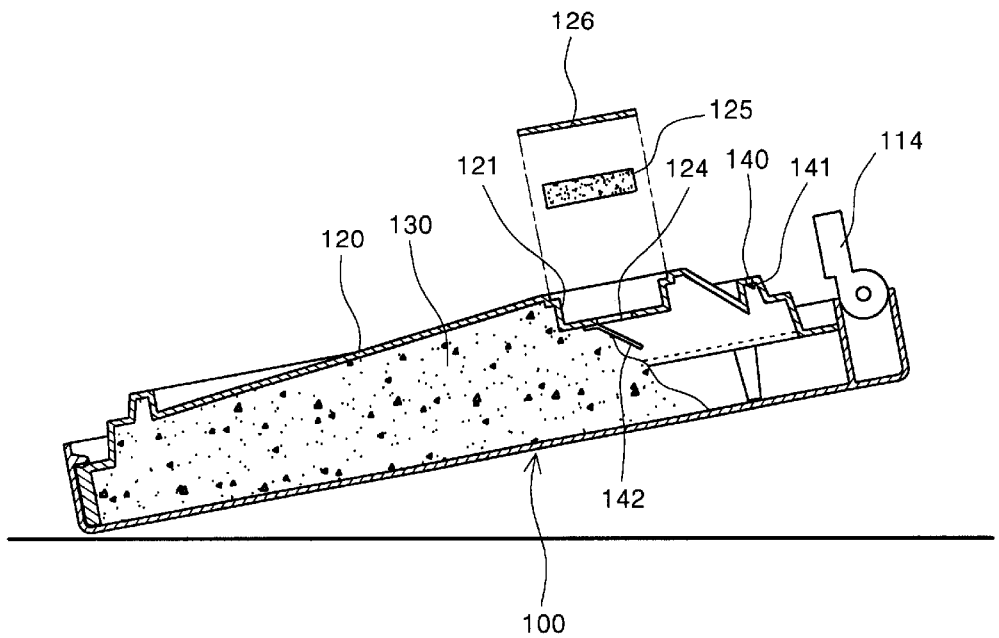
FIG. 6 is a cross-sectional view taken along line "A—A" of FIG. 1, showing a partially completed foam-injection process being performed on the insulated outer structure (e.g., door) for a refrigerated food storage apparatus, in accordance with the embodiment of the present invention.

A foam injection process using the outer structure 100 as described above will now be explained with reference to FIG. 6.

First, the structure 100 is positioned such that the inner liner 120 faces upward and is inclined such that the vents 140 are elevated and the hinges of the flaps 141 and 142 are arranged downward along the incline. In this orientation and with the foam-injection inlet 124 and vents 140 open, foam 130 is injected through the inlet and pours smoothly down the inclined inner surface of the outer shell 110. Thereafter, the injected foam reacts with the air and begins to set, beginning at the lower areas of the inclined structure and proceeding upwards, towards the foam-injection inlet 142 and then to the vents 140. As the foam 130 approaches the first flap 142 at the environs of the foam-injection inlet 124, the rising foam pushes the first flap closed. In turn, the foam 130 reaches the second flap 141 at the environs of the vents 140 and pushes the second flap closed. Thus, as the air within the insulated outer structure 100 and the gas generated by the injected foam 130 are exhausted via the vents 140, the inter-panel space of the structure is completely filled with the foam, without leakage, to achieve an even consistency as shown in FIG. 7.

According to the preferred embodiment of the present invention as described above, in an insulated outer structure for a refrigerated food storage apparatus, which is largely comprised of outer and inner panels coupled together to create an inter-panel space to be filled with a reactive foam insulation, the appearance of the exterior surface of the structure is enhanced by an outer panel (shell) which can be formed without any holes for foam injection access. Since no such foam injection holes are present in the exterior surface, there is no need for a finishing process to be performed and the appearance of the refrigerated food storage apparatus is improved while facilitating its manufacture. The appearance is further improved due to the absence of depressions created in the exterior surface of the outer panel by a molding process, since bosses for maintaining the inter-panel space are formed on the inner panel (liner).

In addition, the foam injection process is facilitated for a variety of reasons. First, due to the foam injection hole being on the inner-panel side, the filling is performed with the flat side of the structure facing downward and properly inclined, so that the foam glides easily to the extremities of the inter-panel space. Secondly, besides the benefit of eliminating the finishing process as mentioned above, the sealing of the foam injection hole (inlet) is performed automatically by the operation of the first flap. Thirdly, the gases generated during the foam injection process are released naturally through the second flap(s), so that a consistent body of insulation can be formed throughout the structure's interior, without buckling, to thereby improve insulation efficiency. Fourthly, there is no need for auxiliary support means for closely fitting the inner and outer panels together during foam injection, due to the operation of a coupling means comprising the bosses and the corresponding snap-fit tabs.

In the embodiment of the present invention, the ventilated container is merely installed on the inner liner for the sake of convenience, but may be installed elsewhere in the interior cabinet, as long as the same deodorizing effect is provided. That is, it should be appreciated that, though usually provided in the door for easy access, the ventilated container or a similar device could be centrally provided on any interior surface of a refrigerated food storage apparatus adopting the present invention. In fact, the main principles of the present invention are applicable to any unobtrusive interior surface of an inner liner combined with an outer shell. Therefore, the insulated outer structure according to the present invention may be applied to an outer wall of a refrigerated food storage apparatus as well as its door.

It is to be understood that the embodiment described herein is merely illustration of the principles of the invention. Various modifications may be made thereto by persons skilled in the art, which will embody the principles of the invention and which fall within the scope of the appended claims.

I claim:

1. An outer structure for a refrigerated food storage apparatus, said outer structure comprising:

an outer shell forming a visible exterior of the refrigerated food storage apparatus; and an inner liner made of molded plastic and coupled to said outer shell using coupling means, to form an inter-panel space to be filled with a body of foam insulation, said inner liner comprising:

a plurality of bosses of a predetermined length, integrally formed with said inner liner at regular intervals and extending toward said outer shell, to support and maintain a constant spacing between said outer shell and said inner liner, at least one foam-injection inlet for injecting foam into the inter-panel space, and a plurality of vents for exhausting air and gases generated during a foam injection process.

2. The outer structure as claimed on claim 1, wherein a reactive foam completely fills the inter-panel space, to form a consistent body of insulation.

3. The outer structure as claimed in claim 2, further comprising a hinged first flap for covering said at least one foam-injection inlet of said inner liner, said hinged first flap being pushed closed by the reactive foam filling the inter-panel space.

4. The outer structure as claimed in claim 2, further comprising a plurality of hinged second flaps for covering said plurality of vents of said inner liner, said hinged second flap being pushed closed by the reactive foam filling the inter-panel space.

5. The outer structure as claimed in claim 1, further comprising a container having a bottom centrally installed on said inner liner.

6. The outer structure as claimed in claim 5, wherein said at least one foam-injection inlet is formed in the bottom of said container, to communicate with the inter-panel space.

7. The outer structure as claimed in claim 5, wherein said container is ventilated and stores a deodorizing element.

8. The outer structure as claimed in claim 1, further comprising a plurality of snap-fit tabs formed on an interior surface of said outer shell, for coupling with an edge of said inner liner and serving as said coupling means.

9. The outer structure as claimed in claim 8, said plurality of snap-fit tabs each comprising a sloped surface for receiving said inner liner and a flat surface for holding said inner liner against said outer shell.

10. The outer structure as claimed in claim 8, wherein depressions resulting from a molding process for forming said inner liner are covered by said plurality of snap-fit tabs.

\* \* \* \* \*